(12) United States Patent
Shekher et al.

(10) Patent No.: US 9,374,427 B2
(45) Date of Patent: Jun. 21, 2016

(54) GEOGRAPHICAL LOCATION BASED CLOUD STORAGE

(71) Applicants: Rahul Shekher, Menlo Park, CA (US); Parag Shekher, San Francisco, CA (US)

(72) Inventors: Rahul Shekher, Menlo Park, CA (US); Parag Shekher, San Francisco, CA (US)

(*) Notice: Subject to any disclaimer, the term of this patent is extended or adjusted under 35 U.S.C. 154(b) by 617 days.

(21) Appl. No.: 13/662,522

(22) Filed: Oct. 28, 2012

(65) Prior Publication Data

US 2013/0110985 A1 May 2, 2013

Related U.S. Application Data

(60) Provisional application No. 61/554,068, filed on Nov. 1, 2011.

(51) Int. Cl.
*G06F 15/16* (2006.01)
*H04L 29/08* (2006.01)

(52) U.S. Cl.
CPC ............ *H04L 67/18* (2013.01); *H04L 67/1097* (2013.01)

(58) Field of Classification Search
CPC ..... H04L 63/10; H04L 63/101; H04L 63/102; H04L 63/107; H04L 63/108; H04L 63/105; H04L 67/18; H04L 67/1097; G06F 17/3087; G06F 17/30041; G06F 17/30268; G06F 17/30749; G06F 2221/21
USPC .......... 709/217–219, 225, 229; 707/785, 724, 707/788, 827; 726/2, 27; 455/456.1
See application file for complete search history.

(56) References Cited

U.S. PATENT DOCUMENTS

| | | | |
|---|---|---|---|
| 2007/0127555 A1* | 6/2007 | Lynch | G06F 17/3087 375/142 |
| 2008/0271109 A1* | 10/2008 | Singh | H04L 63/08 726/1 |
| 2009/0248833 A1* | 10/2009 | Frazier | 709/217 |
| 2010/0185642 A1* | 7/2010 | Higgins et al. | 707/758 |
| 2010/0317323 A1* | 12/2010 | Facemire | H04L 63/0492 455/411 |
| 2011/0016588 A1* | 1/2011 | He | 800/298 |
| 2011/0087690 A1* | 4/2011 | Cairns | G06F 17/30097 707/769 |
| 2011/0165888 A1* | 7/2011 | Shuman | G06F 17/30041 455/456.1 |
| 2011/0301935 A1* | 12/2011 | Quirk | G06F 17/2827 704/2 |
| 2011/0307935 A1* | 12/2011 | Kotecha | 725/119 |
| 2013/0074169 A1* | 3/2013 | Nuzzi | G06F 21/6209 726/7 |

* cited by examiner

*Primary Examiner* — Ario Etienne
*Assistant Examiner* — Kidest Mendaye

(57) ABSTRACT

A system and method to manage files on an online cloud storage system are disclosed. In some embodiments, files stored on the online cloud storage system may be associated with a geographical location and a geographical range. A location of a user may be received. The system and method may determine a level of access to the file for the user based on the location of the user and the geographical location and geographical range of the file. If the location of the user is within the geographical range of the geographical location of the file, then the user may be given a level of permission to access the file stored on the online cloud storage system.

17 Claims, 10 Drawing Sheets

GEOGRAPHICAL LOCATION BASED CLOUD STORAGE

RELATED APPLICATION

This application claims priority and benefit of U.S. Provisional Application No. 61/554,068 filed on Nov. 1, 2011 and entitled "Systems and Methods for Geographical Location Cloud Based Storage."

BACKGROUND

1. Field

The present disclosure is related to the field of file storage. For example, in some embodiments, the disclosure relates towards systems and methods for geographical location based cloud storage.

2. Art Background

Conventional cloud storage services provide networked online storage of data on servers such that users may remotely upload data or access data on a cloud storage service. Users of the cloud service may upload data (e.g., files) to the cloud storage service and subsequently connect to the cloud storage service to download the files that the user has previously uploaded. As such, in a conventional cloud storage service, a user may be provided with an online storage service to store his or her files.

However, conventional cloud storage services do not provide a level of social interaction for users of the cloud storage service. For example, if a first user and a second user uploads files to a conventional cloud storage service, the files of the first user and the files of the second user are kept separate from each other. As such, the first user is unable to access the files uploaded by the second user and the second user is unable to access the files uploaded by the first user.

Users of a cloud storage service would benefit from a level of social interaction provided by a cloud storage service. For example, the cloud storage service may allow a user to access files not originally uploaded by the user. Moreover, providing a level of geographical interaction by the cloud storage service may create a layer of storage abstraction over a geographical region. For example, geographical information of a user and a file may be combined with social interaction to provide a unique cloud storage service experience.

Users of a cloud storage service with certain levels of social interaction and/or geographical information would benefit from a more unique cloud storage experience. Accordingly, it is highly desirable to develop systems and methods for providing geographical location based cloud storage.

SUMMARY

The embodiments described herein provide a system and method for online storage of files. In some embodiments, the files may be stored in an online cloud storage system. A method to display the files may be provided. The method may involve receiving a request from a user to view at least one file where the files are associated with geographical tags comprising a geographical location and a geographical range. A location of the user may be received and a determination may be made as to whether the location of the user satisfies a geographical limitation that is based on the geographical location and the geographical range of a first file. If the location of the user satisfies the geographical limitation, the first file may be displayed to the user.

In some embodiments, the location of the user comprises an address, the geographical location comprises a second address, and the geographical range comprises a distance from the second address.

In some embodiments, the geographical range comprises a distance and the geographical limitation comprises the distance from the geographical location.

In some embodiments, the location of the user satisfies the geographical limitation if the location of the user is within the distance from the geographical location.

In some embodiments, a file classification from the user may be received and the displaying of the first file is further based on whether the first file corresponds to the file classification.

In some embodiments, a request from the user to interact with the first file may be received and the user may be allowed to access the first file based on the geographical limitation of the first file.

In some embodiments, the geographical limitation of the first file comprises a different level of access to the first file based on the location of the user, a first level of access comprises downloading the file and a second level of access comprises previewing the file.

BRIEF DESCRIPTION OF THE DRAWINGS

The novel features of the disclosure are set forth in the appended claims. However, for purpose of explanation, several embodiments of the systems and methods are set forth in the following figures.

DETAILED DESCRIPTION

The systems and methods disclosed herein relate to cloud storage. In some embodiments, the systems and methods relate to geographical location based cloud storage.

Figure 1:
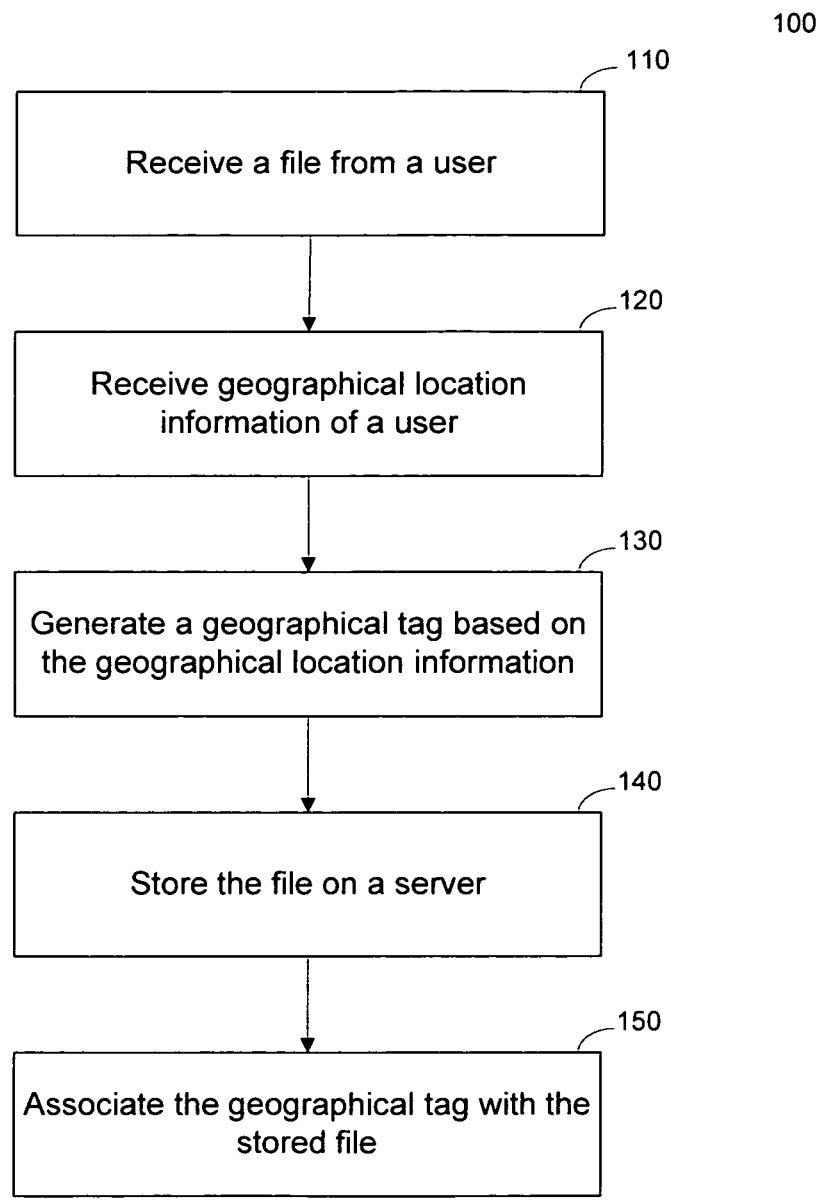
FIG. 1 illustrates a flow diagram of an example method for geographical location based cloud storage.

In the following detailed description, numerous specific details are set forth in order to provide a thorough understanding of the present disclosure. However, it will become obvious to those skilled in the art that the present disclosure may be practiced without these specific details. The description and representation herein are the common means used by those experienced or skilled in the art to most effectively convey the substance of their work to others skilled in the art. In other instances, well known methods, procedures, and systems have not been described in detail to avoid unnecessarily obscuring aspects of the present disclosure.

FIG. 1 illustrates a flow diagram of an example method 100 for geographical location based cloud storage. In general, the method 100 receives a file from a user and associates geographical information to the file received from the user.

As seen in FIG. 1, at block 110, a file may be received from a user. In some embodiments, the file may comprise an electronic file such as a graphic file, video file, audio file, or any other electronic file. For example, the file may comprise a file (e.g., a PDF or word document) depicting a menu of a restaurant. The file may be received by a cloud storage service (e.g., an online storage service comprising one or more servers). At block 120, geographical location information may be received. In some embodiments, the user may provide the geographical location information. In the same or alternative embodiments, the cloud storage service may provide the geographical location information. The geographical location information may be based on a combination of user provided information and cloud storage service provided information. In some embodiments, the geographical location information may comprise a specific location. For example, the geographical location information may comprise an address, street intersection, GPS location, a city block, city, state, country, or any other information used to identify any geographical entity of any size. In some embodiments, the geographical location information may comprise a geographical range. For example, the geographical range may comprise a distance from and/or a radius around the geographical location (e.g., 1 mile). As such, the geographical location information may comprise an address and a corresponding geographical range (e.g., 1 mile).

At block 130 of FIG. 1, a geographical tag may be generated based on the geographical location information. In some embodiments, the geographical tag is generated by the cloud storage service. As such, in some embodiments, the geographical tag may comprise a specific location (e.g., a street address) and a geographical range or distance (e.g., 1 mile). At block 140, the file received from the user is stored by the cloud storage service. At block 150, the geographical tag may be associated with the stored file. In some embodiments, the cloud storage service associates the geographical tag with the stored file.

Figure 2:
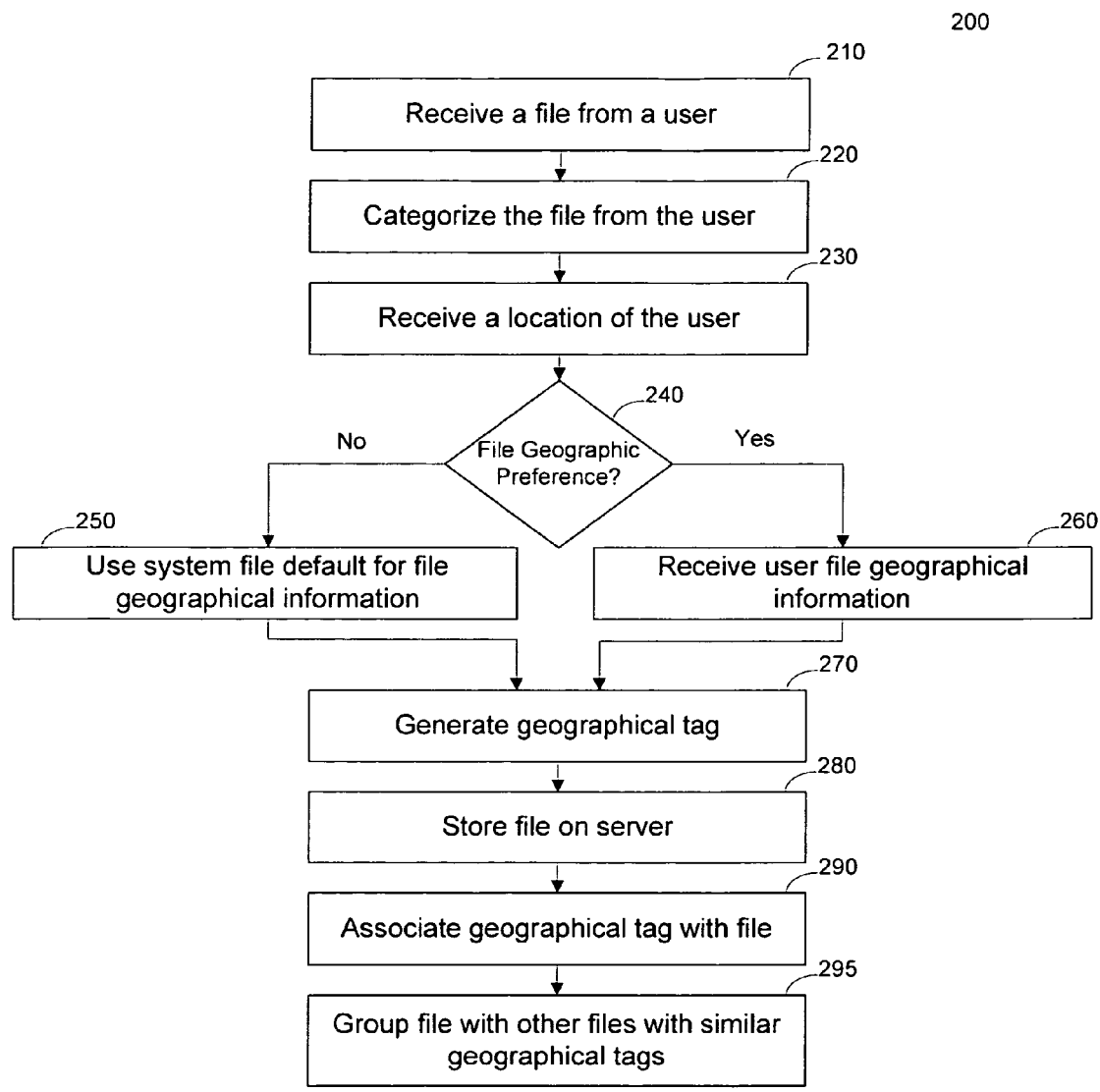
FIG. 2 illustrates a flow diagram of a method for geographical location based cloud storage in accordance with an embodiment.

FIG. 2 illustrates a flow diagram of a method 200 for geographical location based cloud storage in accordance with an embodiment. In general, the method 200 may receive a file from a user and associate geographical information to the file.

As seen in FIG. 2, at block 210, a file may be received from the user. At block 220, the file received by the user may be categorized. In some embodiments, the user may provide categorization information. In the same or alternative embodiments, a cloud storage service may categorize the received file. The categorization of the file may comprise identifying a format (e.g., file type) of the file. For example, the categorization may comprise identifying the file as a word document, audio file, movie file, and so forth. As such, the categorization may comprise identifying a media format of the file. In some embodiments, the categorization may comprise a subject matter classification of the file. For example, the file may be categorized as a restaurant menu. At block 230, a location of the user is received. For example, the user may provide an input location that corresponds to the user's current address. For example, the user may specify his or her street address. In some embodiments, the location of the user may be detected. For example, a GPS location of the user may be provided to a cloud storage service. In some embodiments, the user's Internet Protocol (IP) address may be used to determine the location of the user. As such, a location (e.g., a geographical location) of the user may be received.

At block 240, a determination is made whether a user wants to provide a geographical range, preference, or limitation. The geographical preference may comprise a geographical range. For example, the geographical range may comprise a distance (e.g., 1 mile). As described in further detail below, the location received at block 230 and the geographical range may provide restrictions on whether other users may access or view the file. In some embodiments, the user may specify whether he or she seeks to associate the file with a specific geographical preference. If the user does not wish to provide a geographical preference, then at block 250, no geographical preference may be used and a geographical range of infinity or a value indicating that any user from any geographical location may access, download, and/or view the file. In some embodiments, if the user doesn't provide a geographical preference, then a default geographical preference may be used. For example, the cloud storage service may provide a default geographical preference, limitation, or range of 2 miles. As such, if a user provides an address of '123 Main Street' and does not specify a geographical preference, limitation, or range, then the cloud storage service may provide a default geographical preference, limitation, or range of 2 miles. As such, in some embodiments, the geographical information may comprise the address '123 Main Street' and a geographical preference, limitation, or range of 2 miles. In some embodiments, such geographical information may result in allowing other users with an address or location within two miles (e.g., a two mile radius) of the location '123 Main Street.' However, if the user does have a specific geographical preference, limitation, or range, then at block 260, a geographical preference, limitation, or range may be received from the user. For example, the user may specify any distance or number representing a distance from the location received at block 230. As such, a geographical range may comprise a geographical distance from the location of the user.

As seen in FIG. 2, at block 270, a geographical tag may be generated. In some embodiments, the geographical tag may comprise, but is not limited to, metadata, a separate file from the received file from the user, or information stored in a database. In some embodiments, the geographical tag comprises a location and a distance. As such, the geographical tag may represent information corresponding to a location of a user who has uploaded a file and a geographical range from the location of the user that specifies when the file should be viewed or accessible by other users, as discussed in further detail below. At block 280, the file may be stored on a storage device (e.g., a hard disk drive accessible online via a cloud storage service). At block 290, the geographical tag may be associated with the file. In some embodiments, the association of the geographical tag with a file may comprise inserting metadata into the file received from the user. In some embodiments, a header of a file may be modified to indicate the geographical tag. The association of the geographical tag with the file may comprise creating a separate geographical tag file. In some embodiments, the association of the geographical tag with the file may comprise updating a database. For example, a database may comprise information comprising a file name (e.g., the file received from the user), a geographical location (e.g., the location of the user received at block 230), and a geographical range (e.g., the geographical preference received at block 250 and/or block 260). As such, each file may be associated with a corresponding geographical tag. At block 295, the received file may be grouped with other files with similar geographical tags, as discussed in further detail below.

Figure 3:
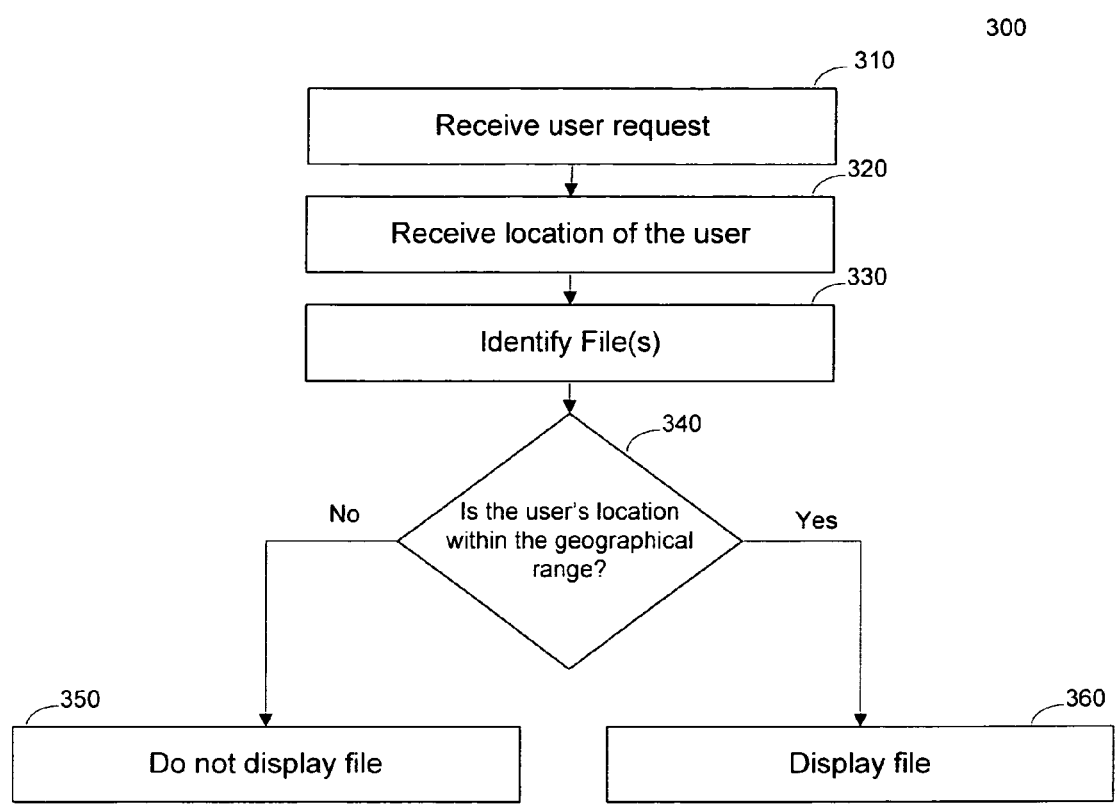
FIG. 3 illustrates a flow diagram of a method for displaying files on a cloud storage service with geographical restrictions in accordance with an embodiment.

FIG. 3 illustrates a flow diagram of a method 300 for displaying at least one file stored on a cloud storage service with geographical restrictions in accordance with an embodiment. In general, a location of a user may be used to determine whether to display or not to display to the user a file stored on the cloud storage service.

As seen in FIG. 3, at block 310, a request from a user may be received. For example, the request may comprise a user login to a cloud storage service. In some embodiments, the user request may comprise a request to view files on the cloud storage service. At block 320, the location of the user is received. For example, the user may be associated with a user account on a cloud storage service and the user account may specify the user's address. In some embodiments, the location of the user may be received from a GPS device or the IP address of the user or entered by the user when uploading the file. At block 330, files on the cloud storage service may be identified. In some embodiments, the files may comprise a specific type of file (e.g., media type or format of the file, file with a particular subject matter classification) requested by the user. At block 340, a determination is made whether the requesting user's location is within a geographical range. If the requesting user's location is not within the geographical range specified by the geographical tag of the file (e.g., not a distance from the geographical location where the distance comprises the geographical range), then, at block 350, the file may not be displayed to the user. If the requesting user's location is within the geographical range specified by the geographical tag of the file, then, at block 360, the file may be displayed to the user. Thus, the determination of whether the requesting user's location is within the geographical range may be a geographical limitation associated with the file. In some embodiments, the geographical limitation (e.g., whether a user is within the geographical range from a geographical location of a file) may be considered a type of file permission for another user to access, view, and/or download the file.

As such, a user may access a cloud storage service and request to view files stored by the cloud storage service. The files stored by the cloud storage service may each be associated with a geographical tag comprising a geographical location (e.g., a street address, city, etc.) and a geographical range (e.g., 1 mile, 50 miles, etc.). Thus, when a user requests to view files stored by the cloud storage service, the user's location may be used to determine whether to display a file to the user. For example, a user may be located at a street address of '789 Main Street.' The cloud storage service may comprise a first file with a geographical tag of '123 Main Street' and a geographical range of '3 miles,' a second file with a geographical tag of '123 Broadway' and a geographical tag of '0.5 miles,' and a third file with a geographical tag of '123 Broadway' and a geographical tag of '100 miles.' As such, if the user's location of '789 Main Street' is within 3 miles of '123 Main Street,' then the first file may be displayed to the user. For example, if '789 Main Street' is at a distance of 1 mile from '123 Main Street,' then the first file may be displayed to the user. However, if '789 Main Street' is 20 miles away from '123 Broadway,' then the second file will not be displayed to the user since the user's location of '789 Main Street' is more than 0.5 miles (the geographical range) away from '123 Broadway.' However, a third file may comprise the same location of '123 Broadway,' but with a different geographical range (e.g., 100 miles). As such, if the user's location of '789 Main Street' is 80 miles away from '123 Broadway,' then the third file may be displayed to the user.

Although the above description with regard to FIG. 3 describe geographical restrictions of a user, one skilled in the art would appreciate that the systems and methods disclosed herein may provide other types of restrictions or preferences. For example, in some embodiments, a file uploaded by a user may comprise a geographical preference as earlier described as well as demographic preferences or restrictions (e.g., gender, age or range of ages, income level, identified interests, etc.). As such, a file may be uploaded to the cloud storage service and a user may be restricted from accessing the file depending on the user's geographical and demographic characteristics.

As such, a geographical limitation may comprise permissions for accessing the file. Permissions may be based on a location of a subsequent user who is requesting the file. In some embodiments, the geographical limitation may determine how a user may interact with the file. For example, a user uploading a file may specify a geographical limitation to the file that the user is uploading. The geographical limitations may include, but are not limited to, downloading the file, seeing the file listed in a server, and/or previewing the file. The geographical limitations may be different based on the geographical range from the geographical location associated with the file. For example, a user uploading a file may specify that if another user is 5 or less miles away (e.g., geographical range) from the geographical location associated with the file, then the another user may view the file listed in the server, preview the file, and/or download the file. However, the user uploading the file may also specify that if another user is more than 5 miles away (e.g., geographical range is more than 5 miles) from the geographical location associated with the file, then the another user may see the file name listed in a list and may preview the file but not be able to download the file. Similarly, limitations may be placed such that if another user is more than 50 miles away from the geographical location, then the another user may not download the file, preview the file, and may not even see the file existing in any search lists or queries. As such, a user's interaction with a file may be based on the geographical limitations associated with the file and/or the user's location. Thus, the geographical limitations may be considered as a type of file permission associated with users.

As such, the geographical range may indicate or specify how far another user requesting the file and/or accessing the cloud storage system may be (e.g., the another user's location) from the uploading user's location in order to access, view, and/or download the file.

Figure 4:
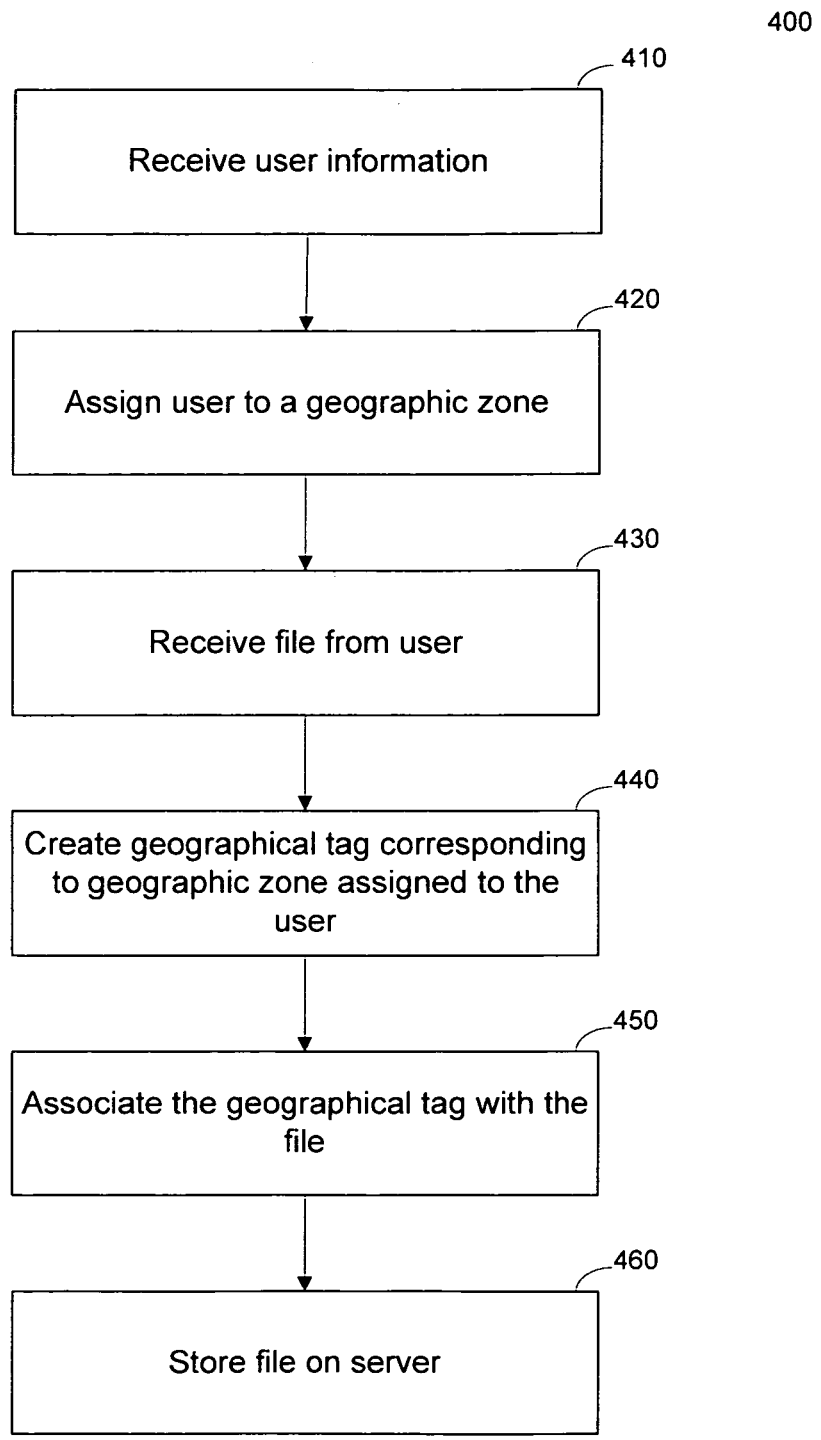
FIG. 4 is a flow diagram of a method for associating a user and a file from a user with a geographical zone.

FIG. 4 is a flow diagram of a method 400 for associating a user and a file from a user with a geographical zone. In general, the method 400 may assign a geographical zone to a user and subsequently assign the same geographical zone to a file received from the user.

As seen in FIG. 4, at block 410, the method 400 may receive user information. For example, the user information may comprise a username (e.g., an account) associated with a user and a geographical location of the user and/or account. At block 420, the user or user account may be assigned to a geographical zone. In some embodiments, the method 400 may be capable of assigning at least one of a plurality of geographical zones. In the same or alternative embodiments, each geographical zone may comprise geographical boundaries defining the geographical zone. In some embodiments, the geographical boundaries may comprise coordinates, latitude or longitude, streets, or other such measures to define a geographical boundary. The geographical boundaries of each geographical zone may be used to determine a geographical zone to assign to the user. For example, the user's geographical location may be used to determine which geographical zone's geographical boundaries the user's geographical location falls within. As such, a user may be assigned to a geographical zone based on the user's geographical location.

At block 430, a file may be received from the user and, at block 440, a geographical tag corresponding to the geographical zone assigned to the user may created. In some embodiments, the geographical tag may comprise information identifying the geographical zone that has been assigned to the user. At block 450, the geographical tag is associated with the file. In some embodiments, the geographical tag may comprise metadata that is attached or inserted into the file. In the same or alternative embodiments, a table or database may identify each file and the associated geographical zone associated with each file. At block 450, the file with the corresponding geographical tag is stored on the online cloud storage service.

Figure 5:
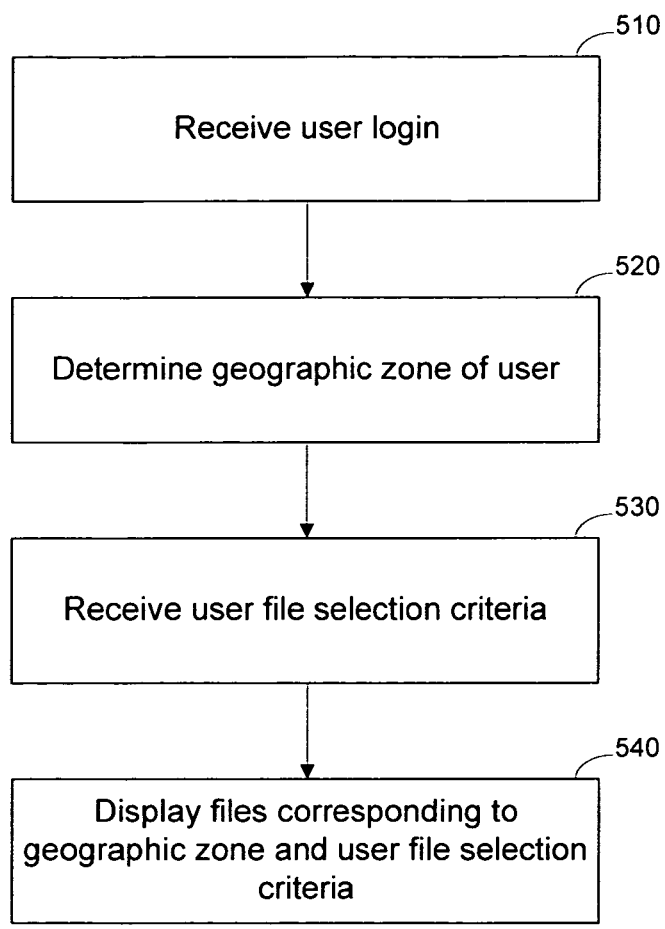
FIG. 5 is a flow diagram for displaying files corresponding to a geographical zone assigned to a user in accordance with some embodiments.

FIG. 5 is a flow diagram 500 for displaying files corresponding to a geographical zone assigned to a user. At block 510, the method 500 may receive a user login. At block 520, a geographical zone of the user may be determined. At block 530, a request may be received corresponding to file selection criteria of the user. In some embodiments, the file selection criteria may comprise a file media type (e.g., a video, audio file, text document, etc.), a subject matter classification of the file (e.g., a restaurant menu, community videos, etc.) And at block 540, the method 500 may display files that correspond to the geographical zone that the user has been assigned to and/or meet the user file selection criteria.

Figure 6:
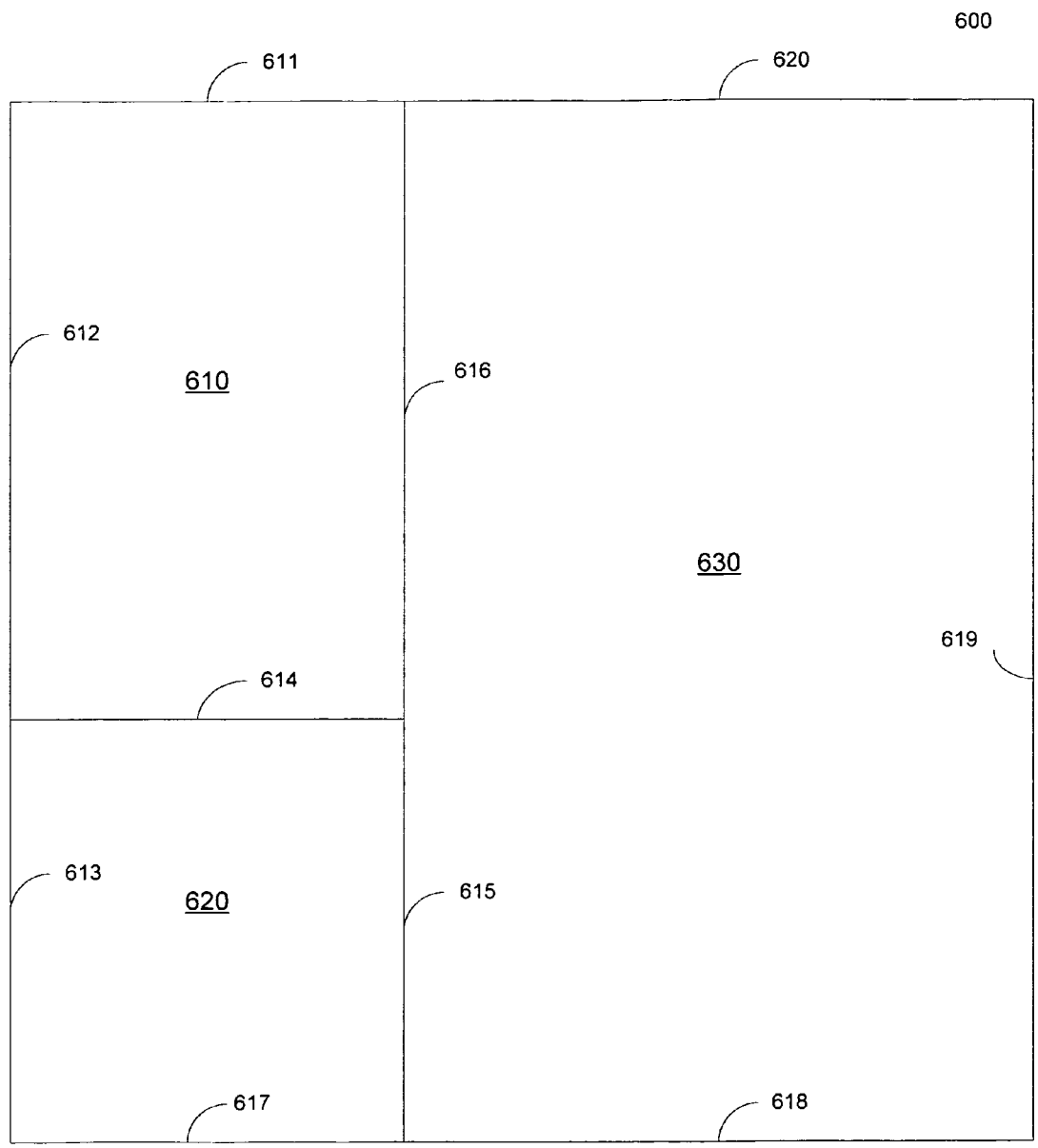
FIG. 6 illustrates a plurality of geographical zones of a geographical area in accordance with some embodiments.

FIG. 6 illustrates a plurality of geographical zones. In general, a geographical region 600 may comprise geographical zones 610, 620, and 630. Each geographical zone may comprise a designated area that may be defined by geographical boundaries. For example, geographical zone 610 may comprise a first neighborhood, geographical zone 620 may comprise a neighborhood adjacent to and to the south of geographical zone 610, and geographical zone 630 may comprise a neighborhood to the east of geographical zones 610 and 620. As such, in some embodiments, each geographical zone may comprise at least one neighborhood or a plurality of neighborhoods. Thus, each geographical zone may correspond to a section of a geographical map.

As seen in FIG. 6, each geographical zone may be defined by one of more geographical boundaries. For example, geographical zone 610 is bounded or defined by geographical boundaries 612, 611, 616, and 614. Geographical zone 620 may be bounded or defined by geographical boundaries 614, 615, 613, and 617. Similarly, geographical zone 630 may be bounded or defined by geographical boundaries 616, 615, 618, 619, and 620. As such, in some embodiments, a geographical zone comprises an area that is closed and defined by one or more geographical boundaries.

In some embodiments, each geographical zone may correspond to a particular geographical area. For example, each geographical zone may correspond to a neighborhood of a city. In the same or alternative embodiments, the geographical boundaries of a geographical area may correspond to a geographical definition. For example, each geographical boundary may correspond to a street of a city. In some embodiments, a geographical zone may be defined by one or more addresses (e.g., street addresses, buildings, landmarks, etc.). As such, a geographical zone may be defined by a collection of addresses.

In some embodiments, a user may be assigned to a geographical zone. For example, a user may be assigned to one of the geographical zones 610, 620, or 630 of FIG. 6. Thus, each geographical zone may be assigned none or one or more users. For example, geographical zone 610 may comprise or be assigned 100 users, geographical zone 620 may comprise or be assigned 500 users, and geographical zone 630 may comprise or be assigned 50 users. In some embodiments, a user may be assigned to a geographical zone based on a user input comprising the user's geographical location. For example, a user may indicate his or her geographical location by inputting his or her address or an intersection. In some embodiments, the systems and methods disclosed herein may determine which geographical zone the location is in. For example, a user may enter an address of '123 W. Tuliptree St.' The cloud storage system may then determine the geographical zone that encompasses the user's address. For example, if '123 W. Tuliptree St.' is within the geographical boundaries 611, 612, 614, and 616, then it may be determined that the user location of the address '123 W. Tuliptree St.' corresponds to or is within the geographical zone 610.

As a result, a section of a geographical area, such as a city, may be sectioned into geographical zones, such as neighborhoods. Each neighborhood may comprise no assigned users or one or more assigned users. Each of the assigned users may upload no files or one or more files. As previously discussed, each file may be associated with a geographical location and/or a geographical zone. Thus, each geographical zone may comprise any number of assigned or corresponding files that have been uploaded by any number of users. For example, geographical zone 610 may comprise 100 users and a total of 1000 files uploaded by the 100 users. Geographical zone 620 may comprise 500 users and a total of 400 files uploaded by the 500 users. Similarly, geographical zone 630 may comprise 50 users and a total of 3000 files uploaded by the 50 users. As such, a user and each file uploaded by the user may be assigned to a particular geographical zone. Thus, each geographical zone may comprise any number of assigned users and any number of files uploaded by the corresponding assigned users.

Figure 7:
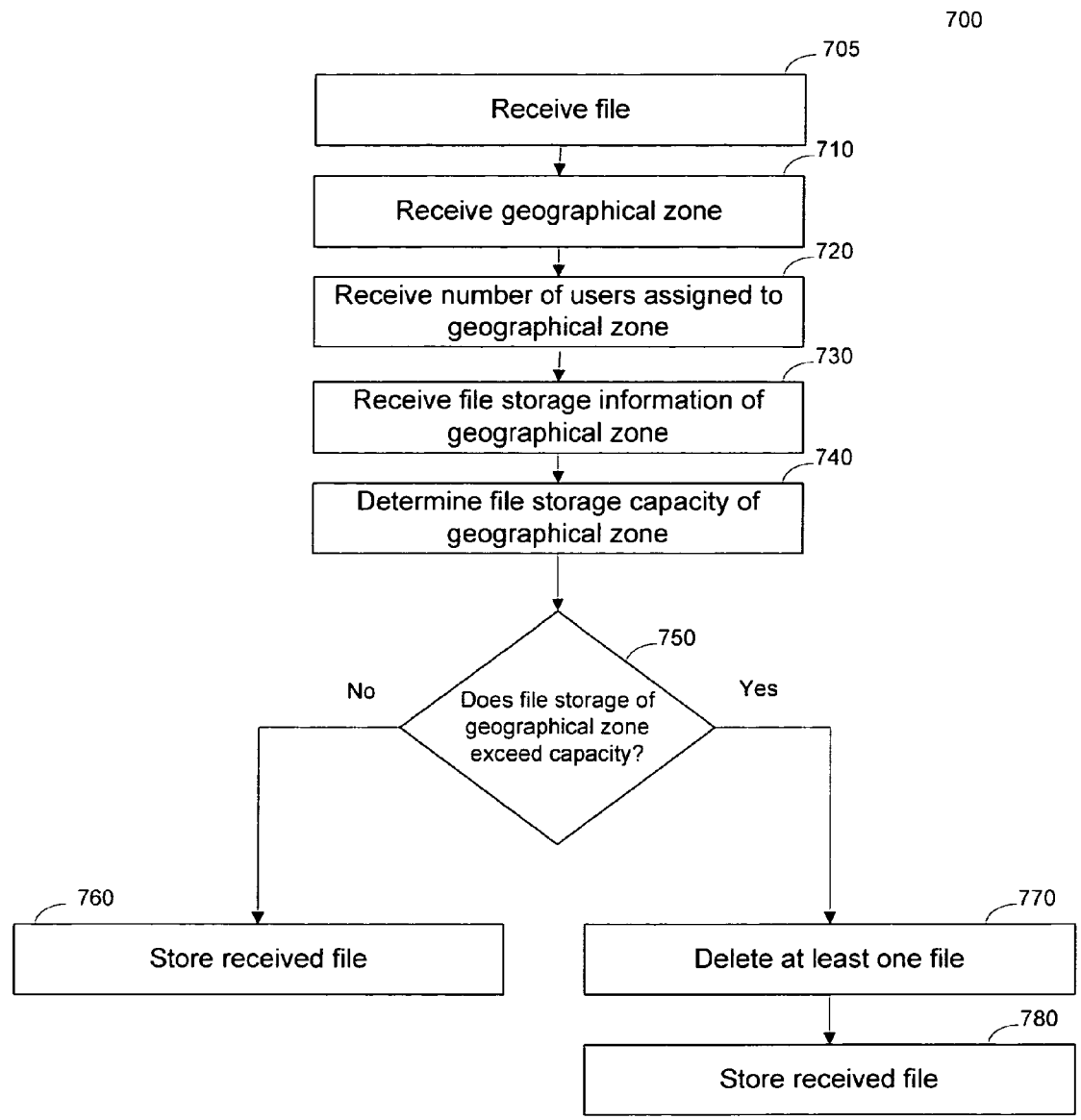
FIG. 7 is a flow diagram of a method for managing file storage of a geographical zone.

FIG. 7 is a flow diagram of a method 700 for managing file storage of a geographical zone. In general, the method 700 may manage the file storage of a geographical zone based on the number of users assigned to the geographical zone and the files currently assigned to the geographical zone.

As seen in FIG. 7, at block 705, a file may be received or uploaded from a user. At block 710, a geographical zone may be received. In some embodiments, the geographical zone may be one of a plurality of geographical zones as seen in FIG. 6. In the same or alternative embodiments, the geographical zone received at block 710 may be a geographical zone associated with or corresponding to or assigned to the received file to be uploaded by a user. For example, a user may upload a file and the user and/or the file may be associated to the geographical zone received at block 710. Thus, in some embodiments, a geographical zone may be received at block 710 when a user uploads a file that is associated with the geographical zone.

At block 720, a number of users assigned to the geographical zone may be received. For example, block 720 may indicate the total number of users that have been assigned or been determined to correspond to, be comprised within, or assigned to the received geographical zone. At block 730, the method 700 may receive file storage information for the received geographical zone. In some embodiments, the file storage information may comprise less than or equal to the total file storage size of files that have been assigned to the geographical zone. For example, the file storage information may indicate the file storage size or requirements of the files that have been uploaded by users assigned to the geographical zone. At block 740, the file storage capacity of a geographical zone may be determined. In some embodiments, a geographical zone's file storage capacity may indicate the total file storage capacity of the geographical zone. In the same or alternative embodiments, each file storage capacity may comprise a predefined file storage capacity for the received geographical zone. In some embodiments, the file storage capacity may be determined based on the number of users assigned to the geographical zone. For example, if 100 users have been or are currently assigned to the received geographical zone, then the file storage capacity of the geographical zone may be based on the 100 users. In some embodiments, each user may correspond to a predefined number corresponding to an amount of file storage capacity. For example, each user may correspond to 100 megabytes (MB) of file storage capacity. As such, a user assigned to a geographical zone may contribute or 100 MB of file storage capacity to the geographical zone. For example, if 25 users are assigned to a geographical zone, then the determined file storage capacity of the geographical zone may be 2500 MB (25 users multiplied by 100 MB per user). Thus, the file storage capacity of a geographical zone may correspond to or be based on the number of users assigned to the geographical zone.

In some embodiments, the file storage capacity of a geographical zone may be determined based on other or additional variables or characteristics. For example, the file storage capacity may be based on the activity of users assigned to the geographical zone or based on the files assigned to the geographical zone. For example, the file storage capacity may be at least partly based on how frequently users assigned to the geographical zone access files that are assigned to the geographical zone. In some embodiments, the file storage capacity may be at least partly based on how frequently users assigned to the geographical zone upload files that are assigned to the geographical zone. In the same or alternative embodiments, the file storage capacity of the geographical zone may be at least partly based on how frequently any file assigned to the geographical zone is accessed (e.g., downloaded) by any user. Other factors that may be used in the determination of the file storage capacity of a geographical zone may comprise the use of any or all of user behavior, file accessing, etc.

In some embodiments, the storage capacity of a geographical zone may be at least partly based on a total file storage capacity for a geographical area and a number of users associated with each geographical zone. For example, as previously discussed, a geographical area may comprise one or more geographical zones. The geographical area may be assigned or associated with a number or value of total file storage capacity. The total file storage capacity of the geographical area may then be divided between less than or equal to the number of users assigned to geographical zones that are part of the geographical area. For example, a geographical area may comprise three geographical zones. The geographical area may be assigned 500 gigabytes (GB) of file storage capacity. A first geographical zone of the geographical area may comprise or be associated with 100 users. The second geographical zone may comprise or be associated with 200 users and the third geographical zone may comprise or be associated with 200 registers users. The file storage capacity of each geographical zone may thus be based on any or all of the number of geographical zones in the geographical area (e.g., three geographical zones), the number of users associated with the geographical zone, and a combination of geographical zones and users. For example, if the geographical area comprises three geographical zones comprising a total of 500 assigned users, then each user may correspond to or add a number of file storage capacity to a geographical zone. For example, each of the 500 users may add 1 GB (e.g., 500 GB associated with the geographical area divided by the number of users associated with geographical zones of the geographical area). As such, the first geographical zone may comprise 100 GB of file storage capacity and the second and third geographical zones may comprise 200 GB of storage capacity.

As seen in FIG. 7, at block 750, a determination may be made whether the file storage of the geographical zone exceed the determined file storage capacity of the geographical zone. In some embodiments, the determination may be made after receiving a file from a user. For example, the determination at block 750 may be made after a user has uploaded a file to be assigned to the geographical zone. In some embodiments, the determination at block 750 may be made during a cloud storage system maintenance period. At block 760, if the file storage of the geographical zone does not exceed the determined file storage capacity, then the file received from a user may be stored. However, if the file storage of the geographical zone does exceed the determined file storage capacity, then at least one file assigned to the geographical zone may be deleted at block 770. In some embodiments, a previously uploaded file from the user may be deleted from the geographical zone associated with the user. In the same or alternative embodiments, a file from another user associated with the geographical zone may be deleted. For example, a file that has not been accessed, viewed, or downloaded by any users may be deleted. In some embodiments, the least viewed, accessed, or downloaded file in the geographical zone may be deleted. As such, a file from the geographical zone may be deleted based on how frequently the file is accessed, viewed, and/or downloaded. In some embodiments, the oldest file (e.g., files uploaded to the geographical zone may be time stamped) currently comprised within the geographical zone associated with the user may be deleted. The file received from the user may be stored at block 780.

Figure 8:
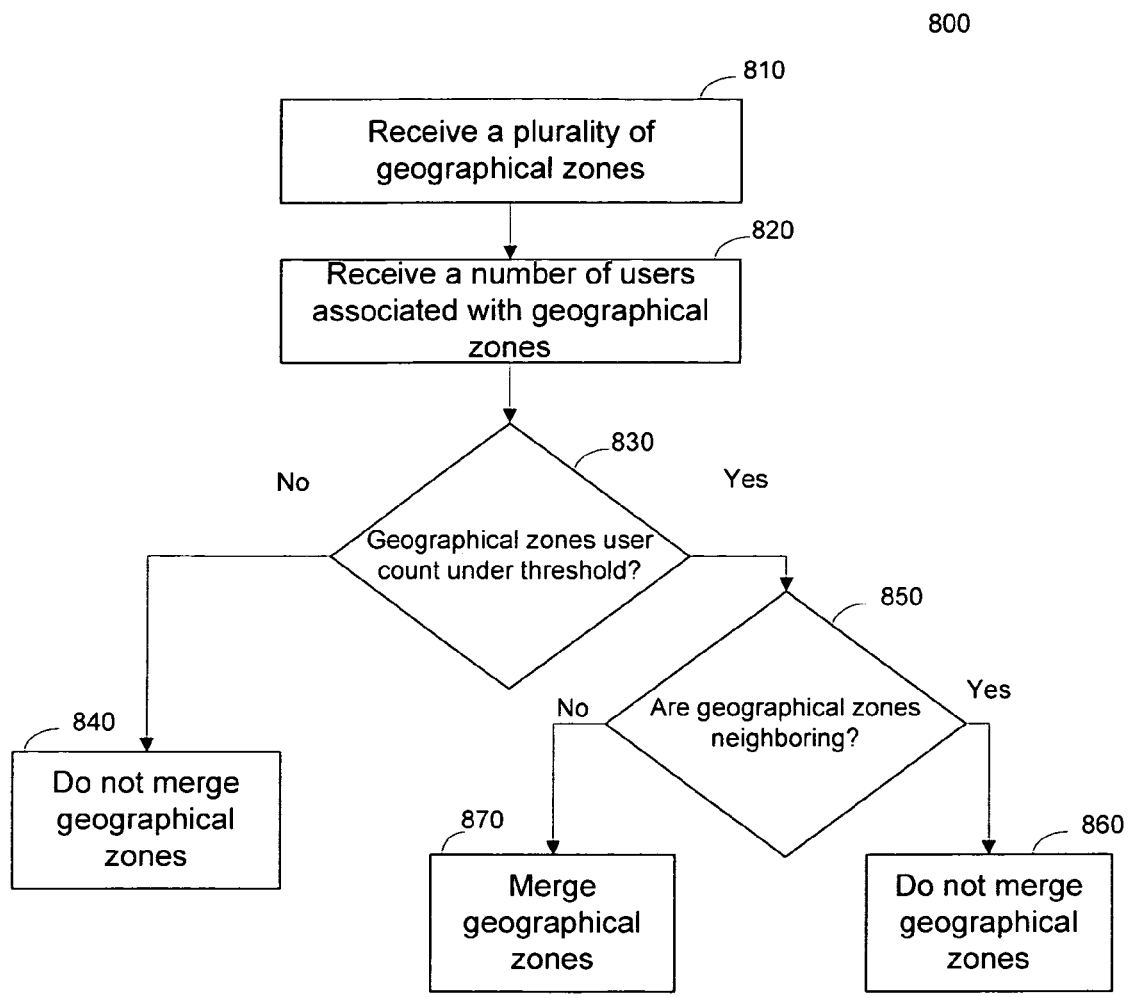
FIG. 8 is a flow diagram of a method for merging geographical zones in accordance with some embodiments of the disclosure.

FIG. 8 illustrates an example method 800 for merging geographical zones. In general, the method 800 may merge together geographical zones based on a threshold of users assigned to the geographical zones.

As seen in FIG. 8, at block 810, a plurality of geographical zones may be received. At block 820, a number of users associated with the geographical zones may be received. For example, a number of users associated with each of the geographical zones may be received. In some embodiments, a number of users who have uploaded files and who are associated with the geographical zones may be received. At block 830, a determination may be made whether a geographical zone or geographical zones user count (e.g., numbers of users as received at block 820) is below a threshold value. If the number of users associated with any of the geographical zones is not below the threshold value, then at block 840, the geographical zones with a user count above the threshold value may not be merged with another geographical zone. If any of the geographical zones' user count is under the threshold value, then at block 850, a determination may be made whether any of the geographical zones with a user count under the threshold value are neighboring geographical zones (e.g., whether the geographical zones with a user count under the threshold value share a geographical boundary). If none of the geographical zones with a user count under the threshold value are neighboring geographical zones, then at block 860, none of the geographical zones may be merged. However, if any of the geographical zones with a user count below the threshold value are neighboring geographical zones, then at block 870, the neighboring geographical zones may be merged. For example, users in a first neighboring geographical zone and users in a second neighboring geographical zone may be merged into a common geographical zone comprising or associated with the users in the first neighboring geographical zone and the second neighboring geographical zone. As such, a new geographical zone may be defined with new geographical boundaries (e.g., comprising geographical boundaries from a combination of the first and second geographical zone) and the users from the merged geographical zones are now associated with the new geographical zone.

In some embodiments, a geographical zone may be split into two or more geographical zones. For example, if a geographical zone is determined to be above a user count threshold value (e.g., the number of users associated with the geographical zone or who have uploaded files to the geographical zone exceeds the user count threshold value), then the geographical zone may be split into two geographical zones. In such a case, the users of the geographical zone may then be assigned or split between the two geographical zones.

Figure 9:
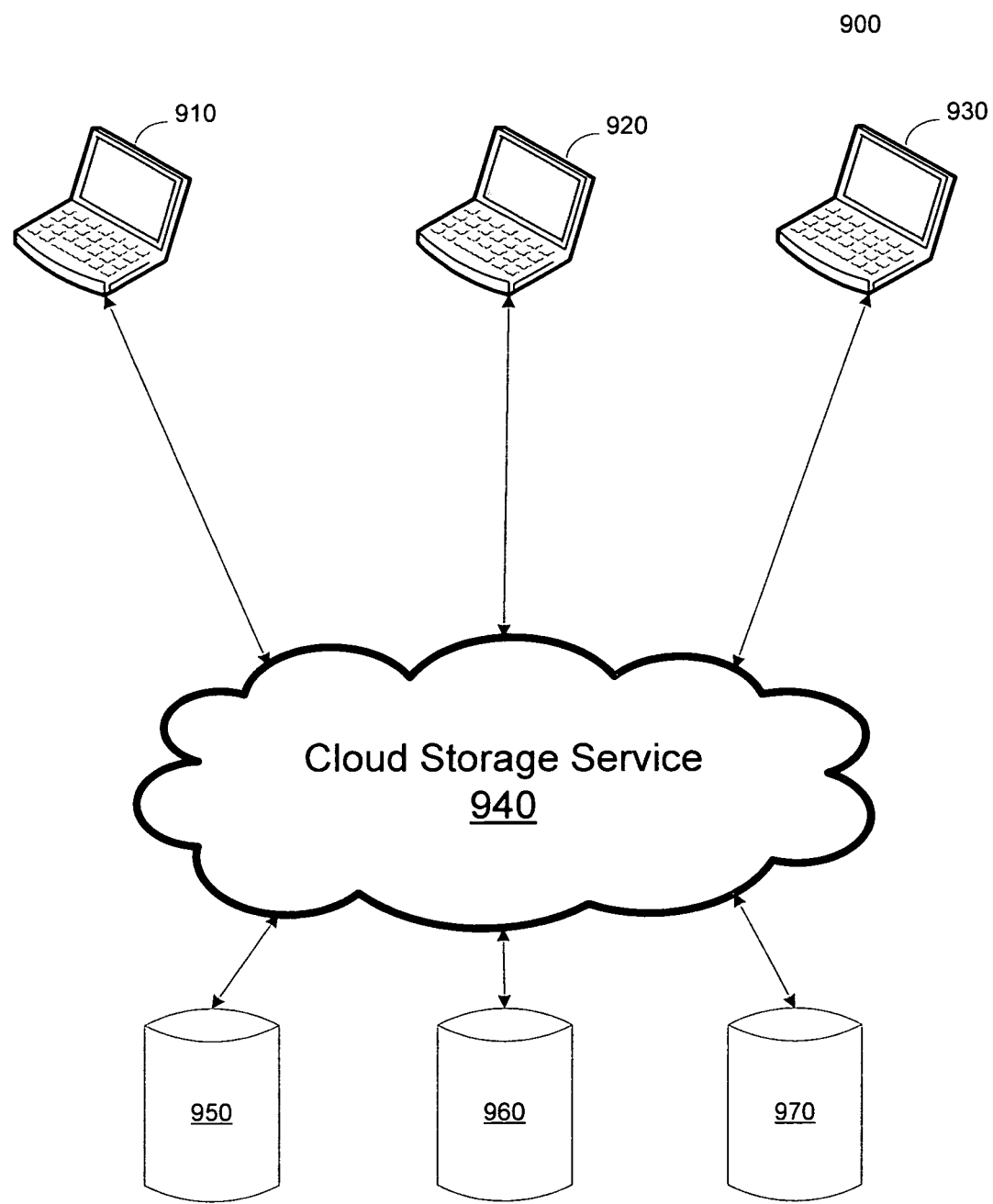
FIG. 9 illustrates a network environment for a cloud storage system in accordance with some embodiments.

FIG. 9 illustrates a network environment 900 for a cloud storage system. In general, the network environment 900 comprises one or more users (e.g., computers, tablets, cell phones), a cloud storage service (e.g., a server), and one or more storage devices to store files received from users of the cloud storage service As seen in FIG. 9, the network environment 900 may comprise users 910, 920, and 930. Each of the users may upload files to the cloud storage service 940. For example, each user may upload a different or separate file to the cloud storage service 940. The cloud storage service may receive the files from the users and store the files on one or more storage devices 950, 960, and 970. In some embodiments, the storage devices may store files received from the users based on the geographical tag associated with each file. For example, storage device 950 may store files with geographical tags that comprise a first geographical location, storage device 960 may store files with geographical tags that comprise a second geographical location, and storage device 970 may store files with geographical tags that comprise a third geographical location.

As such, each of the storage devices 950, 960, and 970 may be used to store received user files at least partly based on the geographical location associated with a user or file.

Figure 10:
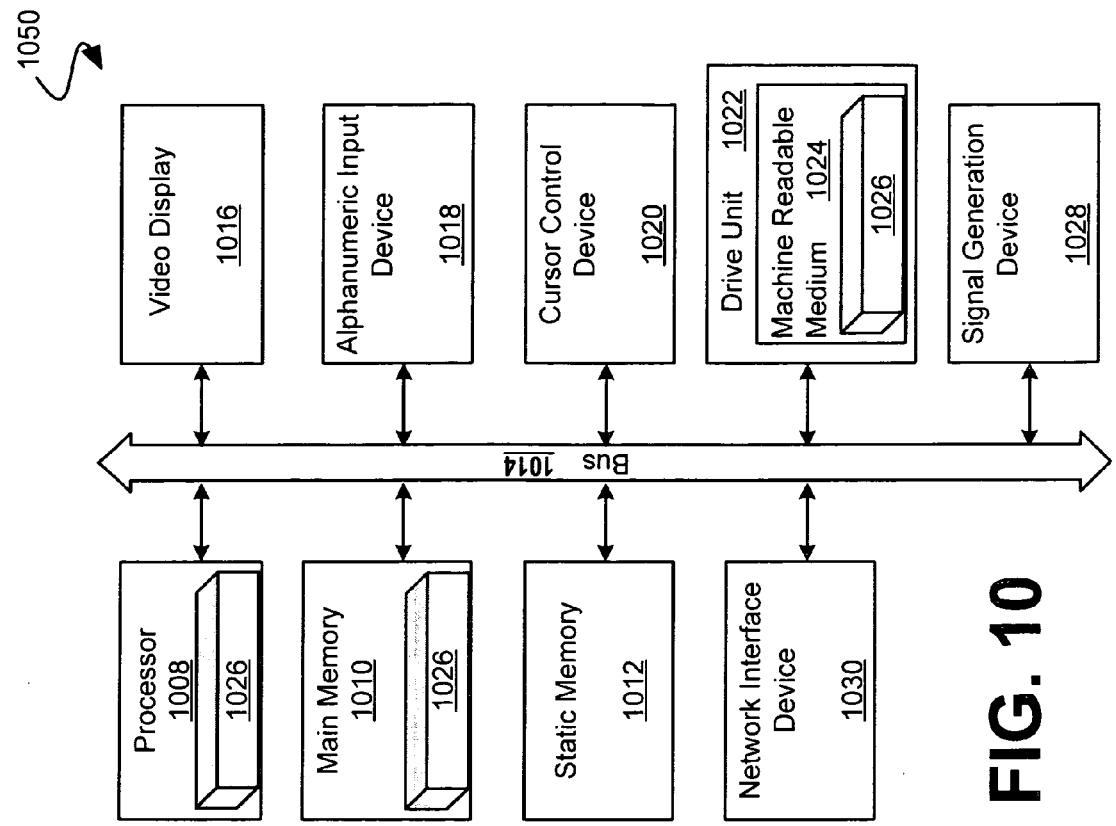
FIG. 10 illustrates an embodiment of a computer system and a network system that incorporates the user goal oriented mapping systems and methods of the present disclosure.
Figure 10:
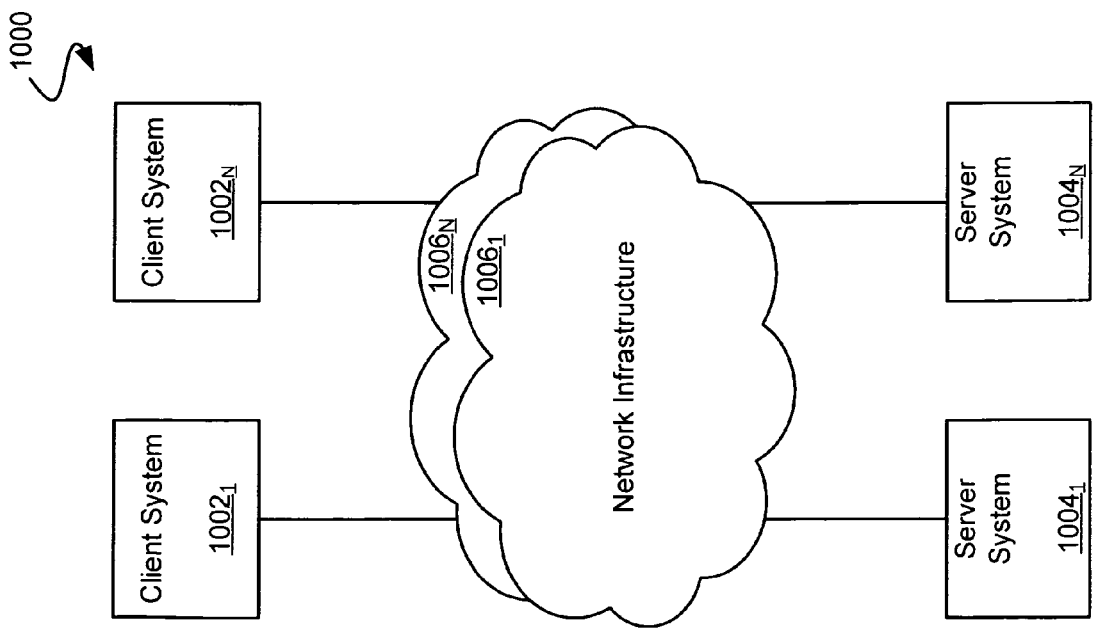

FIG. 10 is a diagrammatic representation of a network 1000, including nodes for client computer systems $1002_1$ through $1002_N$, nodes for server computer systems $1004_1$ through $1004_N$, nodes for network infrastructure $1006_1$ through $1006_N$, any of which nodes may comprise a machine 1050 within which a set of instructions for causing the machine to perform any one of the techniques discussed above may be executed. The embodiment shown is purely exemplary, and might be implemented in the context of one or more of the figures herein.

Any node of the network 1000 may comprise a general-purpose processor, a digital signal processor (DSP), an application specific integrated circuit (ASIC), a field programmable gate array (FPGA) or other programmable logic device, discrete gate or transistor logic, discrete hardware components, or any combination thereof capable to perform the functions described herein. A general-purpose processor may be a microprocessor, but in the alternative, the processor may be any conventional processor, controller, microcontroller, or state machine. A processor may also be implemented as a combination of computing devices (e.g. a combination of a DSP and a microprocessor, a plurality of microprocessors, one or more microprocessors in conjunction with a DSP core, or any other such configuration, etc.).

In alternative embodiments, a node may comprise a machine in the form of a virtual machine (VM), a virtual server, a virtual client, a virtual desktop, a virtual volume, a network router, a network switch, a network bridge, a personal digital assistant (PDA), a cellular telephone, a web appliance, or any machine capable of executing a sequence of instructions that specify actions to be taken by that machine. Any node of the network may communicate cooperatively with another node on the network. In some embodiments, any node of the network may communicate cooperatively with every other node of the network. Further, any node or group of nodes on the network may comprise one or more computer systems (e.g. a client computer system, a server computer system) and/or may comprise one or more embedded computer systems, a massively parallel computer system, and/or a cloud computer system.

The computer system 1050 includes a processor 1008 (e.g. a processor core, a microprocessor, a computing device, etc.), a main memory 1010 and a static memory 1012, which communicate with each other via a bus 1014. The machine 1050 may further include a display unit 1016 that may comprise a touch-screen, or a liquid crystal display (LCD), or a light emitting diode (LED) display, or a cathode ray tube (CRT). As shown, the computer system 1050 also includes a human input/output (I/O) device 1018 (e.g. a keyboard, an alphanumeric keypad, etc.), a pointing device 920 (e.g. a mouse, a touch screen, etc.), a drive unit 1022 (e.g. a disk drive unit, a CD/DVD drive, a tangible computer readable removable media drive, an SSD storage device, etc.), a signal generation device 1028 (e.g. a speaker, an audio output, etc.), and a network interface device 1030 (e.g. an Ethernet interface, a wired network interface, a wireless network interface, a propagated signal interface, etc.).

The drive unit 1022 includes a machine-readable medium 1024 on which is stored a set of instructions (i.e. software, firmware, middleware, etc.) 1026 embodying any one, or all, of the methodologies described above. The set of instructions 1026 is also shown to reside, completely or at least partially, within the main memory 1010 and/or within the processor 908. The set of instructions 1026 may further be transmitted or received via the network interface device 1030 over the network bus 1014.

It is to be understood that embodiments of this disclosure may be used as, or to support, a set of instructions executed upon some form of processing core (such as the CPU of a computer) or otherwise implemented or realized upon or within a machine- or computer-readable medium. A machine-readable medium includes any mechanism for storing information in a form readable by a machine (e.g. a computer). For example, a machine-readable medium includes read-only memory (ROM); random access memory (RAM); magnetic disk storage media; optical storage media; flash memory devices; electrical, optical or acoustical or any other type of media suitable for storing information.

Although the present disclosure has been described in terms of specific exemplary embodiments, it will be appreciated that various modifications and alterations might be made by those skilled in the art without departing from the spirit and scope of the disclosure. The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein, but is to be accorded the widest scope consistent with the principles and novel features disclosed herein.

What is claimed is:

1. A method to provide files stored in a cloud-based storage system, the method comprising:
   receiving a file from a first user;
   identifying a first location of the first user in response to the receiving of the file from the first user, wherein the first location corresponds to a physical location of the first user when the first user uploads the file;
   receiving, from the first user, a geographic range associated with the file corresponding to file access permissions of other users of the cloud-based storage system for the file, wherein the geographic range indicates a distance from the first location;
   associating the file with the first location of the first user and the geographic range;
   storing the file received from the first user;
   receiving a request from a second user of the cloud-based storage system to view one or more files stored in the cloud-based storage system in response to a login of the second user to the cloud-based storage system;
   identifying a second location of the second user in response to the request from the second user, wherein the second location corresponds to a physical location of the second user;
   determining, by a computer, a first distance from the second location of the second user to the first location of the first user;
   providing a first level of access to the file to the second user in response to the first distance from the first location to the second location being larger than the geographic range;
   determining that the second user is at a third location;
   determining, by the computer, a second distance from the third location of the second user to the first location of the first user;
   providing a second level of access to the file to the second user in response to the second distance being smaller or equal to the geographic range, the second level of access providing greater accessibility to the file than the first level of access;
   receiving a second file from a third user after receiving the file from the first user;
   identifying a fourth location corresponding to a location of the third user in response to the receiving of the second file from the third user;
   determining that the fourth location corresponds to the first location; and
   deleting the file received from the first user in response to the determination that the fourth location corresponds to the first location.

2. The method of claim 1, wherein the first level of access to the file provides an identification of the file with a plurality of other files stored in the cloud-based storage system, and wherein the second level of access to the file provides the identification of the file with the plurality of the other files stored in the cloud-based storage system and a download permission for the file.

3. The method of claim 1, wherein the associating the file with the first location of the first user and the geographic range comprises:
   generating metadata information corresponding to the geographic range and the first location; and
   combining the generated metadata information with the file.

4. The method of claim 1, further comprising:
   receiving, from the first user, a demographic preference corresponding to the file access permissions for the file, the demographic preference being specified by the first user; and
   determining whether a demographic characteristic of the second user satisfies the demographic preference specified by the first user, wherein the determination is used to provide the first level of access or the second level of access to the file.

5. The method of claim 1, wherein the deleting of the file is further in response to a file size of the file and a file size of the second file exceeding a file storage capacity assigned to the first location.

6. The method of claim 1, further comprising:
   determining that the fourth location and the first location both are within a geographic zone; and
   adjusting a file storage capacity assigned to the geographic zone in response to the determination that the fourth location and the first location are within the geographic zone.

7. A system comprising:
   a memory; and
   a processor operatively coupled to the memory to:
   receive a file from a first user;
   identify a first location of the first user in response to the receiving of the file from the first user, wherein the first location corresponds to a physical location of the first user when the first user uploads the file;
   receive, from the first user, a geographic range associated with the file corresponding to file access permissions of other users of the system for the file, wherein the geographic range indicates a distance from the first location;
   associate the file with the first location of the first user and the geographic range;
   store the file received from the first user;
   receive a request from a second user of the system to view one or more files stored in the system in response to a login of the second user to the system;
   identify a second location of the second user in response to the request from the second user, wherein the second location corresponds to a physical location of the second user;
   determine a first distance from the second location of the second user to the first location of the first user;
   provide a first level of access to the file to the second user in response to the first distance from the first location to the second location being larger than the geographic range;
   determine that the second user is at a third location;
   determine a second distance from the third location of the second user to the first location of the first user;
   provide a second level of access to the file to the second user in response to the second distance being smaller or equal to the geographic range, the second level of access providing greater accessibility to the file than the first level of access;
   receive a second file from a third user after receiving the file from the first user;
   identify a fourth location corresponding to a location of the third user in response to the receiving of the second file from the third user;
   determine that the fourth location corresponds to the first location; and
   delete the file received from the first user in response to the determination that the fourth location corresponds to the first location.

8. The system of claim 7, wherein the first level of access to the file provides an identification of the file with a plurality of other files stored in the system, and wherein the second level of access to the file provides the identification of the file with the plurality of the other files stored in the system and a download permission for the file.

9. The system of claim 7, wherein the associating the file with the first location of the first user and the geographic range comprises:
generating metadata information corresponding to the geographic range and the first location; and
combining the generated metadata information with the file.

10. The system of claim 7, the processor further to:
receive, from the first user, a demographic preference corresponding to the file access permissions for the file, the demographic preference being specified by the first user; and
determine whether a demographic characteristic of the second user satisfies the demographic preference specified by the first user, wherein the determination is used to provide the first level of access or the second level of access to the file.

11. The system of claim 7, wherein the deleting of the file is further in response to a file size of the file and a file size of the second file exceeding a file storage capacity assigned to the first location.

12. The system of claim 7, the processor further to:
determine that the fourth location and the first location both are within a geographic zone; and
adjust a file storage capacity assigned to the geographic zone in response to the determination that the fourth location and the first location are within the geographic zone.

13. A non-transitory computer readable medium comprising instructions that, when accessed by a processor, causes the processor to perform operations comprising:
receiving a file from a first user at a cloud-based storage system;
identifying a first location of the first user in response to the receiving of the file from the first user, wherein the first location corresponds to a physical location of the first user when the first user uploads the file;
receiving, from the first user, a geographic range associated with the file corresponding to file access permissions of other users of the cloud-based storage system for the file, wherein the geographic range indicates a distance from the first location;
associating the file with the first location of the first user and the geographic range;
storing the file received from the first user;
receiving a request from a second user of the cloud-based storage system to view one or more files stored in the cloud-based storage system in response to a login of the second user to the cloud-based storage system;
identifying a second location of the second user in response to the request from the second user, wherein the second location corresponds to a physical location of the second user;
determining a first distance from the second location of the second user to the first location of the first user;
providing a first level of access to the file to the second user in response to the first distance from the first location to the second location being larger than the geographic range;
determining that the second user is at a third location;
determining a second distance from the third location of the second user to the first location of the first user;
providing a second level of access to the file to the second user in response to the second distance being smaller or equal to the geographic range, the second level of access providing greater accessibility to the file than the first level of access;
receiving a second file from a third user after receiving the file from the first user;
identifying a fourth location corresponding to a location of the third user in response to the receiving of the second file from the third user;
determining that the fourth location corresponds to the first location; and
deleting the file received from the first user in response to the determination that the fourth location corresponds to the first location.

14. The non-transitory computer readable medium of claim 13, wherein the first level of access to the file provides an identification of the file with a plurality of other files stored in the cloud-based storage system, and wherein the second level of access to the file provides the identification of the file with the plurality of the other files stored in the cloud-based storage system and a download permission for the file.

15. The non-transitory computer readable medium of claim 13, the operations further comprising:
receiving, from the first user, a demographic preference corresponding to the file access permissions for the file, the demographic preference being specified by the first user; and
determining whether a demographic characteristic of the second user satisfies the demographic preference specified by the first user, wherein the determination is used to provide the first level of access or the second level of access to the file.

16. The non-transitory computer readable medium of claim 13, the operations further comprising:
determining that the fourth location and the first location both are within a geographic zone; and
adjusting a file storage capacity assigned to the geographic zone in response to the determination that the fourth location and the first location are within the geographic zone.

17. The non-transitory computer readable medium of claim 16, wherein the deleting of the file is further in response to a file size of the file and a file size of the second file exceeding a file storage capacity assigned to the first location.

* * * * *